UNITED STATES PATENT OFFICE.

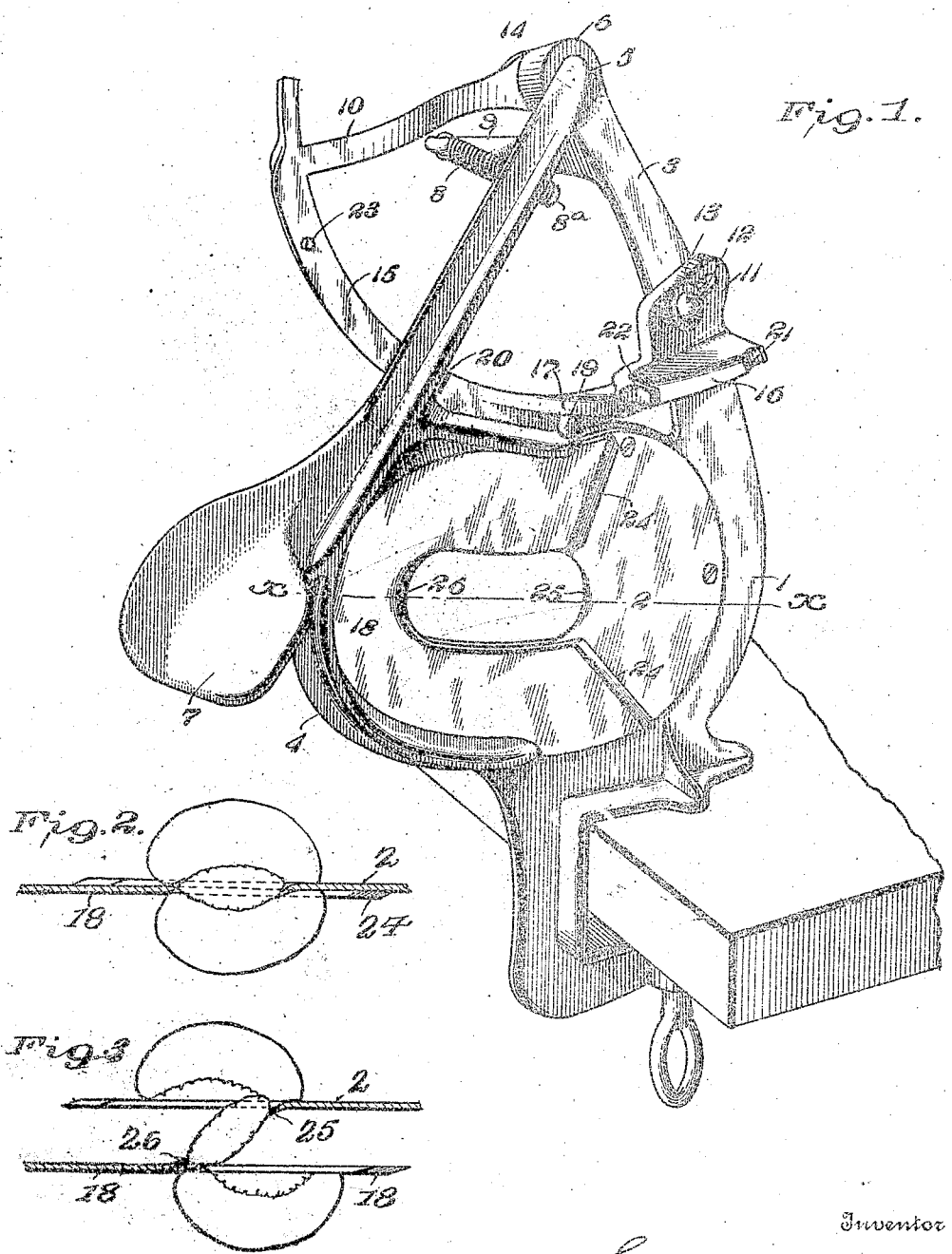

LOUIS E. BALTZLEY, OF WASHINGTON, DISTRICT OF COLUMBIA, ASSIGNOR OF ONE-FOURTH TO ALFRED M. HOUGHTON, OF NEW YORK, N. Y.

FRUIT-PITTING DEVICE.

1,056,965.

Specification of Letters Patent.

Patented Mar. 25, 1913.

Application filed June 20, 1911. Serial No. 635,366.

*To all whom it may concern:*

Be it known that I, LOUIS E. BALTZLEY, a citizen of the United States, residing at Washington, in the District of Columbia, have invented certain new and useful Improvements in Fruit-Pitting Devices, of which the following is a specification.

This invention relates to fruit pitting devices and has for its object the production of a device of such class, which device is extremely simple in construction and operation, and inexpensive of manufacture; and the production of a fruit pitting device which, at the time of severing the fruit will cause the pit to be cleanly and clearly eliminated therefrom and deposited at a point distinct from the place of disposition of the severed portions.

In the usual fruit pitting devices the apparatus necessary to sever the fruit and clean the stone therefrom is generally exceedingly complicated, comprising many separate elements, such as fingers to grip the fruit, blades to sever the same and additional means for eliminating the stone. My invention does away with these complicated parts and therefore does not bruise the fruit during the process of pitting as frequently happens with machines of the character above described.

My invention is particularly useful, and in the embodiment herein set forth is shown and described as a seeder for peaches, either of the free-stone or cling-stone variety, but it is understood that the device may be used in connection with other fruits and particularly fruits of the variety having single stones.

With the above and other objects in view the invention comprises a pair of co-acting blades, each blade provided with means for severing the fruit and with means for gripping the stone, and arranged with relation to each other in such manner that the gripping means for the stone hold the same while the halves of the fruit are pulled, twisted or otherwise removed from said stone.

More specifically set forth my invention comprises a pair of co-acting blades arranged to sever the fruit, each blade provided with an off-set portion arranged in such manner that the off-set portion of one blade will bear against the stone of the fruit on an opposite end than the off-set portion of the other blade, holding means for the blades and means for bringing the blades into proximity with each other for a portion of a stroke in the same general plane and until the off-set portions engage opposite ends of the stone, and means for separating the blades from each other during the remainder of the stroke so that the off-set portions engaging the ends of the stone will hold the same while the blades are being moved laterally and the halves of the fruit split apart and pulled from the stone.

In the accompanying drawings, showing one form of a specific embodiment of my invention; Figure 1 is a perspective view showing the device attached to an edge of a table; Fig. 2 is a horizontal section on line x—x of Fig. 1, showing the blades as they contact with the pit of the fruit; Fig. 3 is a similar section showing the blades as they are separated and near the end of the stroke.

Referring to Fig. 1, element 1 represents a frame or other support carrying the U-shaped blade 2 attached by screws or other means to the frame, and having an integral upright or standard 3. To this upright is attached the second arm or blade-carrying element 4 having the ball 5 arranged to be seated into the socket 6 of the upright 3. The handle 7 serves to swing the blade-carrying element 4 for the whole stroke toward and from the standard or upright 3. In order that this blade-carrying element may be securely but nevertheless yieldably and removably held in position through the ball and socket joint I provide spring 8 attached at one end to a lug 8ᵃ on the blade-carrying element 4 and secured at the other end to a stationary, integral arm 9 on the upright or standard 3. The frame 1 or support or upright 3 also carries the stationary cam segment 10, one end 11 being adjustably secured to the support 3 through the slot 12 and screw 13, and the other end 14 being fixed to the upper end of the upright 3. The segment 10 is secured in position, as above pointed out, so that the portion 15 is in the same vertical plane with the blade 2, and so the cam surfaces 16 and 17 project out in different vertical planes from the plane of said blade 2.

The upper section of the frame 4 carrying blade 18 is provided with abutments or lugs 19 and 20 arranged to slide on the segment 15 and cam surfaces 16 and 17 of said segment and the stops 21 and 22 serve to limit the movement thereof in the forward stroke, while stop 23 limits the length of the backward stroke.

Each blade is provided with a cutting edge 24 and the off-set portions 25 and 26. The off-set portion 25 on blade 2 extends in a direction opposite to the direction of the off-set portion 26 on blade 18. Spring 8 serves to hold the lugs 19 and 20 properly against the segment 15 and the cam surfaces 16 and 17 during the forward and reverse movements of the blade and to anchor the arm 4 at the end of the forward stroke through engagement of the stops or lugs 19 and 20 with the recesses 21 and 22 at the ends of the cam surfaces.

The ball and socket joint, before described, provides for the double movement necessary to the correct operation of the blade-carrying element 4.

It is not essential that the off-set portions 25 and 26 be provided on the two blades, as the edges thereof contacting with the opposite ends of the stone may be sharp enough to be embedded therein and thus serve the purpose accomplished by the two off-set portions.

The operation of my device is as follows: Supposing the cam segment 10 be adjusted for the accommodation of the peach to be pitted, said peach is placed between the cutting blades, and preferably with the longer axis of the stone parallel to the blades. The blade-carrying element 4 is then advanced by means of the handle and the blade 18 thereof co-acting with blade 2 will cut the sarcocarp and the off-set portions 25 and 26 will engage opposite ends of the stone and opposite sides thereof. In this position the lugs 19 and 20 will begin to slide on the cam surfaces 16 and 17, thus carrying the blade 18 out of the plane it has been traveling in and removing it laterally with respect to the first blade as it advances. The stone being held in the off-set portions is pulled, twisted or turned from the pulpy portion of the fruit and the halves of the fruit are separated by the surfaces of the blades. It will be seen that the position of the cam segment can be changed to accommodate the blades to different sized fruits, the segment being pivoted to the upper end of the upright 3 and slidably secured to said upright at a lower point through slot 12 and screw 13. Ordinarily it is not necessary to change the position of this cam segment except when the sizes of the peaches vary to a considerable degree, since approximate adjustment is sufficient.

Only one die is necessary for the manufacture of the blades, they being duplicates, and when the blade-carrying elements and the cam-surfaces are to be made of cast metal only three patterns are necessary. These parts with the spring and the screws constitute the whole apparatus as shown, and these few parts which can be so cheaply manufactured coöperate to produce a machine which not only severs the fruit and holds the stone, but cleanly pulls the meat therefrom and deposits the stone at a point different from the place of disposition of the fruit.

It is to be observed that in pulling the halves of the fruit from the stone, the effect is to pull the meat from the creases of the stone, whereas, if the blades cut the meat from the stone, as in the usual machines, the creases would remain filled with the severed portions of the meat.

What I claim is:—

1. A fruit pitter comprising a support, a blade carried thereby, a standard forming a part of said support and provided with means for securing an arm thereto, an arm pivotally and yieldingly secured to said standard to swing relative thereto, a blade carried by said arm in juxtaposition to said first blade and a stationary guide carried by said support and standard, whereby said arm may be swung in a predetermined path toward and from said standard.

2. A fruit pitter comprising a support, a blade carried thereby, a standard forming a part of said support and provided with means for securing an arm thereto, an arm pivotally and yieldingly secured to said standard, a blade carried by said arm in juxtaposition to said first blade, and an adjustable guide carried by said support and standard whereby said arm may be reciprocated in a predetermined path.

3. A fruit pitter comprising a support, a blade carried thereby, an overhanging standard forming part of said support and provided with means for securing an arm in swinging relation thereto, an arm pivotally carried by said standard in swinging relation thereto, a cutting blade carried by said arm, a handle for swinging the same, and a guide for said arm attached to said support.

4. A fruit pitter comprising a support, a blade carried thereby, an overhanging standard forming part of said support and provided with means for securing an arm thereto, an arm pivotally carried by said standard, a cutting blade carried by said arm, a handle for reciprocating the same, and a guide for said arm attached to said support and adjustable thereon.

5. A fruit pitter comprising a support, a blade carried thereby, a standard arranged on said support, a swinging arm pivotally secured to said standard, a cutting blade carried by said arm and means for swinging the same toward and from said standard, a guide for said arm attached to said standard and having a cam surface, and the said arm provided with means for engaging the cam surface as it swings toward and from said standard.

6. A fruit pitter comprising a support, a blade carried thereby, a standard arranged on said support, an arm secured by said standard, a cutting blade carried by said arm and means for reciprocating the same, a guide for said arm attached to said standard and having a cam surface, and means for adjusting the guide on said standard.

7. In a fruit pitter, a stationary blade, and a reciprocal blade, a stationary guide for the reciprocal blade, and means for adjusting said guide.

8. In a fruit pitter, a reciprocal blade, a blade coöperating therewith to sever the fruit, a support for said coöperating blade, a standard carried by said support, said reciprocal blade pivotally attached in operative position to swing on said standard, and a guide on said standard for said reciprocal blade arranged to change its direction of travel as it swings on said standard.

9. In a fruit pitter, a stationary blade, a reciprocal blade, and an adjustable stationary guide for the reciprocal blade, whereby the said reciprocal blade may be made to travel different predetermined paths.

10. In a fruit pitter, a reciprocal blade, a blade coöperating therewith to sever the fruit, a support carrying said coöperating blade, a standard carried by the support, said reciprocal blade being attached in operative position to said standard, a guide on the standard for said reciprocal blade, and tension means for holding said reciprocal blade against said guide.

11. A fruit pitter having a support, a stationary blade carried thereby, a standard for said support, a reciprocal arm removably secured to the standard and adapted to travel toward and from said stationary blade, a blade carried by said arm in operative relation to said first blade, a guide for changing the direction of travel of the reciprocal arm, and tension means for holding said reciprocal arm in position on said guide.

12. A fruit pitter comprising a support, a blade carried thereby, a standard on said support and provided with a stationary arm, a reciprocal arm pivotally attached to said standard carrying a blade and provided with a lug, guiding means for said reciprocal arm on the standard, and a spring attached to the said stationary arm and said lug for holding the reciprocal arm in position relative to said guiding means.

13. In a fruit pitter, a support, a blade carried thereby, a reciprocal arm attached thereto through a universal joint comprising a ball and socket, and a blade for said reciprocal arm.

14. In a fruit pitter, a standard carrying a blade, a reciprocal arm attached thereto through a universal joint comprising a ball and socket, said arm provided with a blade, and tension means for securing a yielding attachment of said arm to said standard.

15. In a fruit pitter, a standard, a reciprocal arm attached thereto through a universal joint comprising a ball and socket and carrying a blade, and a spring means for yieldingly attaching said arm to said standard.

16. A fruit pitter comprising a pair of cutters each having pit engaging means, one such cutter arranged to advance toward the other cutter in the same general plane therewith for a portion of its stroke, and a cam for changing the direction of the stroke of the advancing cutter, and means for changing the position of the cam so that the point of change of the direction of said advancing cutter may be varied.

17. A fruit pitter comprising a support constituting a stationary frame, a blade secured to the frame, a reciprocal arm constituting a frame pivotally attached to said support, a blade secured to the frame, means for reciprocating the second blade in a general direction toward the stationary frame but gradually during the latter portion of the stroke in a lateral direction also.

18. A fruit pitter comprising a stationary cutter, a relatively movable cutter arranged to swing toward and from the same, and stationary means coöperating with the swinging cutter for changing the direction of the latter as it approaches the stationary cutter.

19. A fruit pitter comprising a stationary cutter and a relatively movable cutter arranged to swing toward and from the same, means for changing the direction of the swinging cutter as it approaches the stationary cutter and means for anchoring the swinging cutter at the end of its stroke.

20. A fruit pitter comprising a plurality of cutting blades, a stationary support for one such blade, said support provided with an upright having a socket therein, a movable support for another blade, said movable support having an extension with a ball formed on an end thereof, an arm extending from said stationary support, a lug arranged on said movable support and a spring holding the stationary and movable supports in operative position through the ball and socket and the arm and lugs on said supports.

21. A fruit pitter comprising a stationary cutter, a movable cutter and holding means for said cutters, the holding means for the stationary cutter provided with an adjustable guide for the holding means of the movable cutter.

In testimony whereof, I affix my signature in the presence of witnesses.

LOUIS E. BALTZLEY.

Witnesses:
 EDWARD R. WITMAN,
 ALFRED M. HOUGHTON.